(No Model.)
E. D. SCHMITT.
FRICTION CLUTCH.
No. 434,611. Patented Aug. 19, 1890.
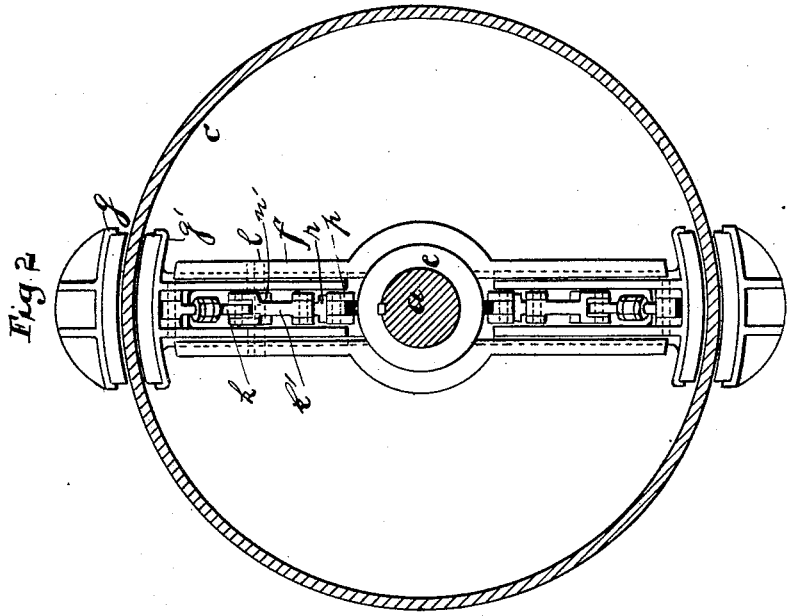
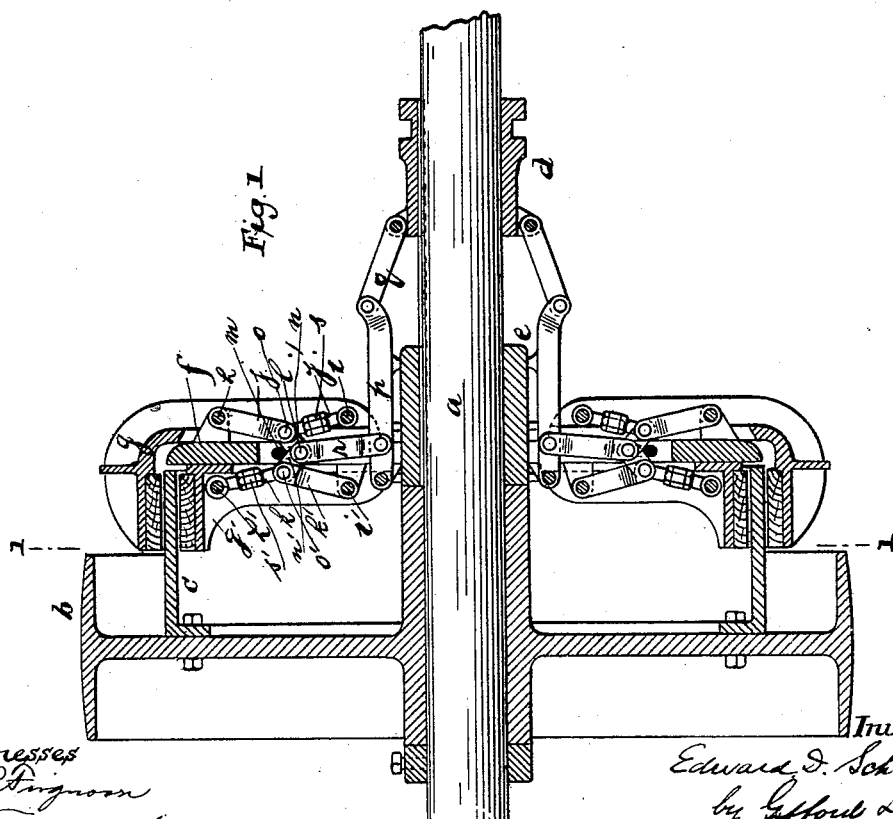
Witnesses
Inventor
Edward D. Schmitt
by Gifford & Brown
Attys.

UNITED STATES PATENT OFFICE.

EDWARD D. SCHMITT, OF CUYAHOGA FALLS, OHIO, ASSIGNOR TO THE FALLS RIVET AND MACHINE COMPANY, OF OHIO.

FRICTION-CLUTCH.

SPECIFICATION forming part of Letters Patent No. 434,611, dated August 19, 1890.

Application filed April 11, 1889. Renewed December 9, 1889. Serial No. 333,010. (No model.)

*To all whom it may concern:*

Be it known that I, EDWARD D. SCHMITT, of Cuyahoga Falls, Ohio, have invented a new and useful Improvement in Friction-Clutches, of which the following is a specification.

This invention relates to that class of clutches in which a flange cylindrical to the shaft is gripped on opposite sides by a pair of inversely-moving jaws, which move upon a clutch-arm. Examples of such class may be seen in Letters Patent No. 383,104, dated May 22, 1888; No. 367,856, dated August 9, 1887, and No. 308,872, dated December 9, 1884.

My invention relates to the mechanism by which the motions of the shifting-sleeve are transmitted to the jaws; and it consists in interposing between each of said jaws and the clutch-arm a toggle-joint, both of which joints are operated by a third toggle-joint interposed between them, and the third toggle-joint being operated by appropriate mechanism from the shifting-sleeve.

In the drawings, Figure 1 represents a longitudinal section through the axis of the pulley and clutch; Fig. 2, a transverse section through the line 1 1 of Fig. 1.

$a$ is the shaft; $b$, the pulley; $c$, the friction-flange; $d$, the shifting-sleeve; $e$, a hub keyed to the shaft, from which the clutch-arms $f$ radiate; $g$, the outside jaw; $g'$, the inside jaw. These jaws are of the form shown, and are provided with guideways on opposite sides of the clutch-arm $f$, to which they may be held by a tongue-and-groove connection, as indicated in Fig. 2. The friction-surfaces of these jaws may be faced with wood.

$h$ is a pivot mounted upon the clutch-arm.
$i$ is a pivot upon the stem of the jaw $g$.
$j$ and $j'$ are the two links of a toggle-joint interposed between the pivot $h$ and the pivot $i$.
$h'$ is a pivot on the stem of the inner jaw $g'$.
$i'$ is a pivot on the clutch-arm.
$k$ and $k'$ are the two links of a toggle-joint between the pivots $h'$ and $i'$.
$l$ is a pivot, which passes through the slot $m$ in the clutch-arm and answers for the central pivot of a third toggle-joint, composed of the links $n$ and $n'$, which links are connected at their extremities with the central pivots of the toggle-joints $j\ j'$ and $k\ k'$, which central pivots are lettered, respectively, $o$ and $o'$. Now, it is obvious that when the pivot $l$ is shoved outward radially, so as to straighten the toggle-joint $n\ n'$, the pivots $o$ and $o'$ will be shoved apart, so as to straighten the toggle-joints $j\ j'$ and $k\ k'$, and the length of the links of the toggle-joint $n\ n'$ will be preferably so regulated as to throw the pivots $o$ and $o'$ slightly beyond a direct line between the pivots $h\ i$ and $h'\ i'$, respectively, so that when closed the clutch will be locked.

In order to push the pivot $l$ outward radially, the following mechanism may be employed. A lever $p$ is pivoted at one end to the clutch-arm and at the other end to the extremity of the link $q$, by which it is connected with the shifting-sleeve $d$. At some point intermediate its extremities the lever $p$ is pivoted to a link $r$, which connects it with the pivot $l$. Now, it is obvious that when the shifting-sleeve $d$ is shoved toward the hub of the clutch the adjacent end of the lever $p$ will be thrown outward from the shaft, and this will force the link $r$ to shove the pivot $l$ outward, so as to close and lock the jaws, as before described.

In order to make the adjustability of the parts to take up the wear of the friction-surfaces, the links $j$ and $k$ may be made extensible by means of the nuts $s$ and $s'$, which are respectively connected by right and left hand screws with each half of the links, so that by turning in one direction the link can be elongated and by turning in the opposite direction the link can be shortened.

I claim—

1. In combination, a friction-flange cylindrical to the shaft, a radial clutch-arm, members moving inversely on the clutch-arm and provided with jaws adapted to grasp the friction-flange on opposite sides, a toggle-joint for each of said members adapted to move the same radially, a third toggle-joint interposed between the central pivots of each of said first-mentioned toggle-joints, and devices by which said last-named toggle-joint may be operated, substantially as described.

2. In combination, a friction-flange cylindrical to the shaft, a clutch-arm, members moving inversely on the clutch-arm and provided with jaws adapted to grasp the friction-flange on opposite sides, a toggle-joint for each of said members adapted to move the same radially, a third toggle-joint whereby each of said first two mentioned toggle-joints are operated, and a lever pivoted to the clutch and connected by links with the shifting-sleeve and the third-mentioned toggle-joint, respectively, substantially as described.

E. D. SCHMITT.

Witnesses:
ORLANDO WILCOX,
H. J. STAMBAUGH.